(12) United States Patent
Hong et al.

(10) Patent No.: US 12,231,896 B2
(45) Date of Patent: Feb. 18, 2025

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Seok Hong, Suwon-si (KR); Junhee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 17/751,977

(22) Filed: May 24, 2022

(65) Prior Publication Data

US 2022/0312216 A1 Sep. 29, 2022

Related U.S. Application Data

(63) Continuation of application No. PCT/KR2022/003878, filed on Mar. 21, 2022.

(30) Foreign Application Priority Data

Mar. 23, 2021 (KR) ........................ 10-2021-0037329

(51) Int. Cl.
*H04W 12/33* (2021.01)
*H04W 12/08* (2021.01)
*H04W 12/63* (2021.01)

(52) U.S. Cl.
CPC ........... *H04W 12/33* (2021.01); *H04W 12/08* (2013.01); *H04W 12/63* (2021.01)

(58) Field of Classification Search
CPC ... H04W 12/08; H04W 12/082; H04W 12/30; H04W 12/33; H04W 12/37; H04W 12/63; H04W 12/65
See application file for complete search history.

(56) References Cited

U.S. PATENT DOCUMENTS

| 9,483,887 B1 | 11/2016 | Soleimani |
| 9,794,753 B1 | 10/2017 | Stitt et al. |

(Continued)

FOREIGN PATENT DOCUMENTS

| CN | 109074443 | 12/2018 |
| KR | 10-2014-0085952 | 7/2014 |

(Continued)

OTHER PUBLICATIONS

Dehaye, "Inferring distance from Bluetooth signal strength: a deep dive", May 19, 2020, http://shorturl.at/dyDEK, 25 pages.

(Continued)

*Primary Examiner* — Siu M Lee
(74) *Attorney, Agent, or Firm* — Nixon & Vanderhye, P.C.

(57) ABSTRACT

An electronic apparatus is disclosed. The electronic apparatus includes: a communication interface comprising communication circuitry, and a processor configured to: identify strength of a signal received from an external device through the communication interface, based on the strength of the identified signal being greater than or equal to a threshold value, unlock authorization restriction on the electronic apparatus, wherein the processor is further configured to: based on the strength of the identified signal being less than the threshold value, maintain the authorization restriction, and based on authentication of the electronic apparatus being completed after the signal is received, adjust the threshold value based on strength of at least one signal received from the external device before the signal is received.

17 Claims, 9 Drawing Sheets

(56) References Cited

U.S. PATENT DOCUMENTS

| | | | |
|---|---|---|---|
| 9,963,108 B2 | 5/2018 | Nishidai et al. | |
| 10,374,804 B2 | 8/2019 | Lee et al. | |
| 10,616,710 B2 | 4/2020 | Stitt et al. | |
| 10,631,165 B1* | 4/2020 | Goyal | H04W 4/023 |
| 2014/0077929 A1* | 3/2014 | Dumas | G07C 9/00571 |
| | | | 340/5.61 |
| 2014/0376453 A1* | 12/2014 | Smith | H04W 16/20 |
| | | | 370/328 |
| 2015/0327060 A1* | 11/2015 | Gilson | H04W 76/11 |
| | | | 726/7 |
| 2017/0142589 A1 | 5/2017 | Park et al. | |
| 2020/0195772 A1 | 6/2020 | Huh et al. | |

FOREIGN PATENT DOCUMENTS

| | | |
|---|---|---|
| KR | 10-2015642 | 10/2019 |
| KR | 10-2020-0043130 | 4/2020 |
| WO | 2015/023737 | 2/2015 |

OTHER PUBLICATIONS

Search Report and Written Opinion issued Jun. 14, 2022 in counterpart International Patent Application No. PCT/KR2022/003878.

* cited by examiner

ELECTRONIC APPARATUS AND METHOD FOR CONTROLLING THEREOF

CROSS-REFERENCE TO RELATED APPLICATIONS

This application is a continuation of International Application No. PCT/KR2022/003878 designating the United States, filed on Mar. 21, 2022, in the Korean Intellectual Property Receiving Office and claiming priority to Korean Patent Application No. 10-2021-0037329, filed on Mar. 23, 2021, in the Korean Intellectual Property Office, the disclosures of which are incorporated by reference herein in their entireties.

BACKGROUND

Field

The disclosure relates to an electronic apparatus and a control method thereof. For example, the disclosure relates to an electronic apparatus performing communication with an external device and a control method thereof.

Description of Related Art

With the development of electronic technology, various types of electronic apparatuses have been developed and distributed.

Particularly, the user does not only use one electronic apparatus, but uses a plurality of electronic apparatuses at the same time or at different times.

There is also a method in which a user directly performs an authentication procedure in order to unlock the electronic apparatus and unlock an access right of an electronic apparatus. However, recently, when it is identified that a distance between a plurality of electronic apparatuses is close, a method of automatically unlocking and unlocking an access right of any one electronic apparatus has been widely used.

This method has an advantage of being convenient since the electronic apparatus is automatically unlocked only when a specific electronic apparatus registered in the electronic apparatus is located close to the user, even if the user does not directly perform an authentication procedure.

Although it determines whether a specific electronic apparatus is located close to each other using strength of a signal received from the specific electronic apparatus, this method has a problem in that there is a deviation in strength of a signal transmitted for each electronic apparatus.

For example, there was a problem in that the electronic apparatus does not automatically unlock even when an external device that transmits a strong signal is not located close to the electronic apparatus, or does not automatically unlock even when an external device that transmits a weak signal is located close to the electronic apparatus.

Since it is almost impossible to measure strength of the signal for all electronic apparatuses and calculate a distance for each strength of the signal based on this, there was a demand for a method to optimize a distance at which the electronic apparatus is automatically unlocked without a separate optimization process.

SUMMARY

Embodiments of the disclosure provide an electronic apparatus which is automatically unlocked and its authorization restriction is automatically unlocked, and a method for controlling thereof.

According to an example embodiment of the disclosure, an electronic apparatus includes: a communication interface comprising communication circuitry, and a processor configured to: identify strength of a signal received from an external device through the communication interface, based on the strength of the identified signal being greater than or equal to a threshold value, unlock authorization restriction on the electronic apparatus, wherein, based on the strength of the identified signal being less than the threshold value, maintain the authorization restriction, and based on authentication of the electronic apparatus being completed after the signal is received, adjust the threshold value based on strength of at least one signal received from the external device before the signal is received.

The processor may be configured to: identify strength of the at least one signal received for a threshold time before the signal is received, and adjust the threshold value based on a distribution of the strength of the at least one signal.

The processor may be configured to: identify strength of a new signal continuously received in a state in which the authorization restriction is maintained, and based on the strength of the new signal being equal to or greater than the threshold value, unlock the authorization restriction.

The processor may be configured to: based on no input to the electronic apparatus being received within the threshold time after the authorization restriction is unlocked, adjust the threshold value based on the strength of the new signal.

The external device may include, based on a distance to the electronic apparatus being less than a threshold distance, a device pre-registered in the electronic apparatus to unlock the authorization restriction.

The processor may be configured to identify a distance to the external device based on strength of a signal, and identify whether the identified distance is less than the threshold distance, wherein the threshold distance corresponds to the threshold value.

The processor may be configured to: based on entering an initial setting mode, provide a guide such that the external device and the electronic apparatus are spaced apart by the threshold distance, and set the threshold value based on the strength of the signal received from the external device while the guide is provided.

The processor may be configured to: based on the external device being an unregistered device, or based on the processor performing first communication with the external device, enter the initial setting mode and provide the guide.

The processor may be configured to: based on an event occurring more than a threshold number of times, or based on a certain time elapsing after adjusting the threshold value, readjust the threshold value, and wherein the event includes an event in which the authentication is completed within a specified time in a state that the authorization restriction is maintained based on the strength of the identified signal being less than the threshold value.

The authentication may include at least one of password input, pattern input, and biometric authentication.

According to an example embodiment of the disclosure, a method for controlling an electronic apparatus includes: identifying a strength of a signal received from an external device, based on the strength of the identified signal being greater than or equal to a threshold value, unlocking authorization restriction on the electronic apparatus, and based on the strength of the identified signal being less than the threshold value, maintaining the authorization restriction, and based on authentication of the electronic apparatus being completed after the signal is received, adjusting the threshold value based on strength of at least one signal received from the external device before the signal is received.

The adjusting may include identifying strength of the at least one signal received for a threshold time before the signal is received, and adjusting the threshold value based on a distribution of the strength of the at least one signal.

The adjusting may include identifying strength of a new signal continuously received in a state in which the authorization restriction is maintained, and based on the strength of the new signal being equal to or greater than the threshold value, unlocking the authorization restriction.

The adjusting may include, based on no input to the electronic apparatus being received within the threshold time after the authorization restriction is unlocked, adjusting the threshold value based on the strength of the new signal.

The external device may, based on a distance to the electronic apparatus being less than a threshold distance, include a device pre-registered in the electronic apparatus to unlock the authorization restriction.

The method may further include: identifying a distance to the external device based on the strength of the signal, and identifying whether the identified distance is less than the threshold distance, wherein the threshold distance corresponds to the threshold value.

The method may further include: based on entering an initial setting mode, providing a guide such that the external device and the electronic apparatus are spaced apart by the threshold distance, and setting the threshold value based on the strength of the signal received from the external device while the guide is provided.

The providing the guide may include: based on the external device being an unregistered device, or based on a processor performing first communication with the external device, entering the initial setting mode and providing the guide.

The adjusting may include: based on an event occurring more than a threshold number of times, or based on a certain time elapsing after adjusting the threshold value, readjusting the threshold value, and wherein the event may be an event in which the authentication is completed within a specified time in a state that the authorization restriction is maintained based on the strength of the identified signal being less than the threshold value.

The authentication may include at least one of password input, pattern input, and biometric authentication.

According to various example embodiments of the disclosure, the electronic apparatus may identify whether an external device is located close to the electronic apparatus, and automatically unlock the electronic apparatus or unlock authorization restriction.

In identifying a distance whether the external device is located close to the electronic apparatus, the distance may be flexibly adjusted in consideration of a usage pattern and characteristics based on a combination of devices.

A preferred unlock area and distance may be set in consideration of the usage pattern and features based on a combination of devices.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the example embodiments to a specific embodiment form. Instead, modifications, equivalents and replacements included in the disclosed concept and technical scope of this disclosure may be employed. While describing various example embodiments, if it is determined that the specific description regarding a known technology obscures the gist of the disclosure, the specific description may be omitted.

The terms such as "first," "second," and so on may be used to describe a variety of elements, but the elements should not be limited by these terms. The terms used herein are simply intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The example embodiments of the disclosure will be described in greater detail below. However, various example embodiments may be realized in a variety of different configurations, and are not limited to descriptions provided herein. Well-known functions or constructions may not described in detail where they would obscure the disclosure with unnecessary detail.

Figure 1:
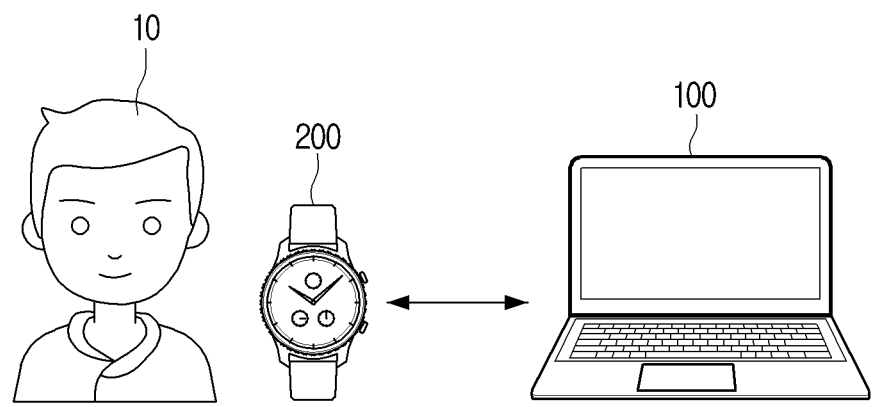
FIG. 1 is a diagram illustrating an example system according to various embodiments.

FIG. 1 is a diagram illustrating an example system according to various embodiments.

Referring to FIG. 1, the electronic apparatus 100 may perform communication with an external device 200, and when it is identified that the external device 200 is close to the electronic apparatus, the electronic apparatus 100 may be unlocked and unlock authorization restriction.

The external device 200 may, for example, be a device previously registered in the electronic apparatus 100 as a trusted device. For example, a user 10 of the external device 200 may be the same as the user 10 of the electronic apparatus 100, and the user 10 of the external device 200 may perform authentication on the electronic apparatus 100 to unlock the electronic apparatus, authorization restriction, or the like.

Before the user 10 directly authenticates the electronic apparatus 100, if the external device 200 is identified as being close to the electronic apparatus 100, the electronic apparatus 100 may identify that the user 10 is close to the electronic apparatus 100, and even when the user 10 does not perform authentication, the electronic apparatus 100 may be unlocked and unlock authorization restriction, or the like.

The electronic apparatus 100 may identify whether the external device 200 is close using various types of communication methods. For example, the electronic apparatus 100 may perform direct communication (e.g., device-to-device communication) with the external device 200 and identify strength of the signal received from the external device 200. When the strength of the signal is greater than or equal to a threshold value, the electronic apparatus 100 may unlock the electronic apparatus 100 and unlock restrictions on access authorization, or the like.

As another example, the electronic apparatus 100 may identify a distance to the external device 200 based on the strength of the signal received from the external device 200. When a distance to the external device 200 is less than a threshold distance, for example, when the electronic apparatus 100 identifies that the external device 200 is close, the electronic apparatus 100 may unlock the electronic apparatus 100, unlock restrictions on access authorization, or the like.

The access authorization may refer, for example, to control authorization for various types of electronic apparatus 100, such as authorization for the user 10 to access, read, record, and execute programs, processes, data, directories, files, etc. of the electronic apparatus 100. Hereinafter, it may be referred to as authorization.

When the electronic apparatus according to the prior art predicts and estimates the distance to the external device 200 based on the strength of the signal received from the external device 200, strength of a signal transmitted by each external device 200 may not be constant. Since there may be a deviation between the external devices 200, there may be a problem in that the electronic apparatus identifies (or predicts) a distance somewhat inaccurately.

For example, an external device A transmits a signal relatively stronger than an external device B, and in reality, even when the external device A and the external device B are respectively spaced apart from the electronic apparatus by the same distance, the electronic apparatus may identify that the external device A is located closer than the external device B.

Accordingly, there was a problem in that the electronic apparatus unlocks authorization restriction even when the external device 200 is not located close to the electronic apparatus, or the electronic apparatus does not unlock the authorization restriction even when the external device 200 is located close to the electronic apparatus.

According to various embodiments of the disclosure, the electronic apparatus 100 unlocks the authorization restriction of the electronic apparatus 100 based on the strength of the signal received from the external device 200 while minimizing and/or reducing an occurrence of the problems described above.

Figure 2:
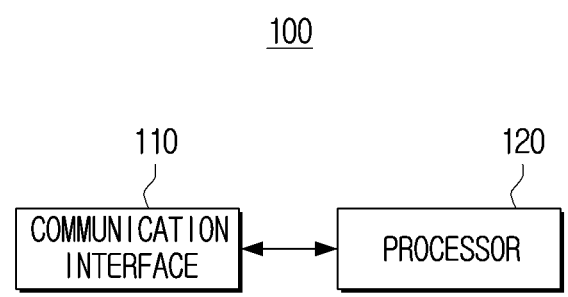
FIG. 2 is a block diagram illustrating an example configuration of an electronic apparatus according to various embodiments.

FIG. 2 is a block diagram illustrating an example configuration of an electronic apparatus according to various embodiments.

Referring to FIG. 2, the electronic apparatus 100 includes a communication interface (e.g., including communication circuitry) 110 and a processor (e.g., including processing circuitry) 120.

The electronic apparatus 100 according to various example embodiments may include at least one of, for example, and without limitation, a set-top box, smartphone, tablet PC, mobile phone, video phone, e-book reader, desktop PC, laptop PC, workstation, server, personal digital assistant (PDA), portable multimedia player (PMP), MP3 player, Kiosk, or the like. However, the electronic apparatus 100 may be implemented as various types of electronic apparatuses such as, for example, and without limitation, a wearable device corresponding to at least one of an accessory type (e.g., watch, ring, bracelet, anklet, necklace, glasses, contact lens, or head-mounted-device (HMD)), fabric or cloth-embedded type (e.g., e-cloth), a robot, a projector, a server or the like. The external device 200 shown in FIG. 1 may also be implemented as various types of electronic apparatuses.

The communication interface 110 may refer to a configuration for the electronic apparatus 100 to communicate with at least one external device 200 to exchange signals/data. For this operation, the communication interface 110 may include a circuit or various communication circuitry. The communication interface 110 may include a wireless communication module, a wired communication module, or the like.

For example, the communication interface 110 may directly communicate with the external device 200 to receive a signal from the external device 200. For example, the communication interface 110 may receive signal/data from an external device (e.g., source device), an external storage medium (e.g., USB memory), an external server (e.g., web hard drive) through a communication method such as an AP-based Wi-Fi (Wireless LAN network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, or the like.

The processor 120 may include various processing circuitry and control the overall operation of the electronic apparatus 100.

According to an embodiment, the processor 120 may be implemented, for example, and without limitation, as a digital signal processor (DSP), a microprocessor, an artificial intelligence (AI), a timing controller (T-CON) that processes a digital image signal. However, it is not limited thereto, and may include one or more of, for example and without limitation, a central processing unit (CPU), a dedicated processor, microcontroller unit (MCU), micro processing unit (MPU), controller, application processor (AP), or communication processor (CP), ARM processor, or may be defined with a corresponding term. In addition, the processor 120 may be implemented as a system on chip (SoC) or large-scale integration (LSI) with a built-in processing algorithm, or may be implemented in the form of field programmable gate array (FPGA).

The processor 120 according to an embodiment of the disclosure may receive a signal from the external device 200 through the communication interface 110 and identify the strength of the received signal. For example, the processor 120 may identify (or predict, estimate, etc.) a distance to the external device 200 based on the strength of the signal received from the external device 200.

For example, the processor 120 may control the communication interface 110 to communicate with the external device 200. For example, the electronic apparatus 100 may perform two-way short-range wireless communication such as Bluetooth or Wi-Fi with the external device 200.

When strength of the identified signal is greater than or equal to a threshold value, the processor 120 according to an embodiment of the disclosure may unlock authorization restriction for the electronic apparatus 100.

For example, if the strength of the signal is greater than or equal to the threshold value, the processor 120 may identify that the external device 200 is located within a threshold distance to the electronic apparatus 100 and unlock the authorization restriction on the electronic apparatus 100.

As another example, when the strength of the identified signal is less than the threshold value, the processor 120 may maintain the authorization restriction for the electronic apparatus 100. For example, if the strength of the signal is less than the threshold value, the processor 120 may identify that the external device 200 is not located within a threshold distance to the electronic apparatus 100 and maintain the authorization restriction on the electronic apparatus 100. In the above example, the processor 120 may unlock or maintain the authorization restriction based on the strength of the signal, or as another example, identify (or predict, estimate) the distance between the electronic apparatus 100 and the external device 200 based on the strength of the signal to unlock or maintain the authorization restriction.

Hereinafter, it is assumed, by way of non-limiting example, that the threshold distance is 1 m for convenience of description.

However, when an actual distance between the electronic apparatus 100 and the external device 200 is 1 m, a distance to the external device 200 identified by the electronic apparatus 100 based on strength of the signal may be different from the actual distance. For example, an actual distance between the electronic apparatus 100 and the external device 200 may be different from the distance from the external device 200 identified by the electronic apparatus 100 based on the strength of the signal according to various reasons such as specifications of a signal transmission module included in the external device 200, specifications of a signal reception module included in the electronic apparatus 100, or a combination characteristic between the electronic apparatus 100 and the external device 200, surrounding environment (e.g., indoor walls, furniture, home appliances, etc.) of the electronic apparatus 100 and the external device 200, a moving speed of the user 10 holding the external device 200, or the like.

Due to such differences, even though the actual distance between the electronic apparatus 100 and the external device 200 is less than 1 m, strength of the signal identified by the processor 120 may be less than a threshold value, or a distance identified based on the strength of the signal may be 1 m or more. Since the actual distance between the electronic apparatus 100 and the external device 200 is less than 1 m, that is, less than the threshold distance, the processor 120 is supposed to unlock the authorization restriction of the electronic apparatus 100, but the processor 120 maintains the authorization restriction. In this case, the electronic apparatus 100 may adjust a threshold value or a threshold distance in order to properly unlock the authorization restriction of the electronic apparatus 100 according to the strength of the signal received from the external device 200.

A detailed description thereof will be described in greater detail below with reference to FIG. 3.

Figure 3:
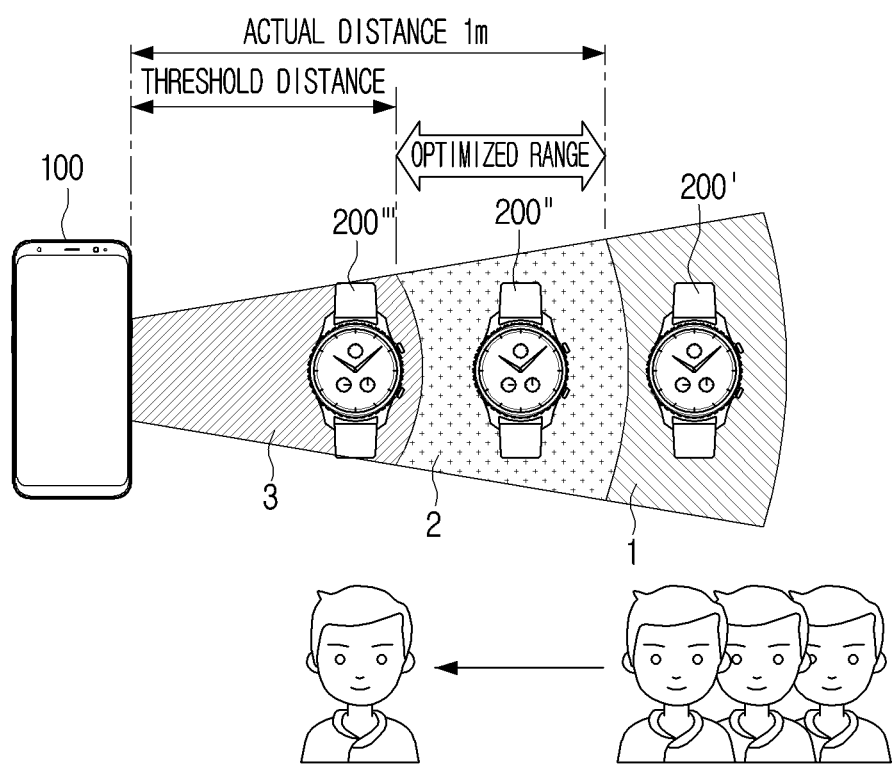
FIG. 3 is a diagram illustrating an electronic apparatus for adjusting a threshold value according to various embodiments.

FIG. 3 is a diagram illustrating an example electronic apparatus for adjusting a threshold value according to various embodiments;

Referring to FIG. 3, it is assumed when a location of the electronic apparatus 100 is fixed, the external device 200 is implemented as a wearable device, and the user 10 moves, a distance between the electronic apparatus 100 and the external device 200 changes.

However, this is an example, and various embodiments of the disclosure may be applied if the distance between the electronic apparatus 100 and the external device 200 is changed regardless of respective implementation examples of the electronic apparatus 100 and the external device 200. FIG. 3 assumes that a threshold distance is 1 m and that a second area 2 is within the threshold distance of 1 m.

The processor 120 according to an embodiment may identify strength of the signal received from an external device 200' located in a first area 1. When the strength of the signal is less than a threshold value, the processor 120 may maintain authorization restriction. The processor 120 may identify a distance based on the strength of the signal, and maintain authorization restriction when the identified distance is equal to or greater than a threshold distance. However, hereinafter, it is assumed that the processor 120 identifies strength of the signal and identifies whether the strength of the signal is greater than or less than a threshold value to unlock or maintain the authorization restriction, for convenience of description.

When the external device 200' is located in the first area 1, strength of the signal received by the processor 120 is sufficiently weak than the threshold value, such that a probability that the processor 120 unlocks the authorization restriction of the electronic apparatus 100 is low.

As another example, when a signal is received from an external device 200' located in a third area 3, since an external device 200''' is located within the threshold distance, that is, strength of the signal received from the external device 200''' is equal to or greater than the threshold value, the processor 120 may unlock the authorization restriction. When the external device 200''' is located in the third region 3, the received strength of the signal is sufficiently strong, and thus a probability that the processor 120 does not unlock the authorization restriction is low.

As another example, when a signal is received from an external device 200" located in the second area 2, the electronic apparatus 100 may identify the external device 200" is located within the threshold distance, and (identify the external device 200" is located in the third area 3), or is located outside the threshold distance (identify the external device 200" is located in the first area 1). In other words, since the strength of the signal identified by the processor 120 has an error, the processor 120 may have a problem of maintaining the authorization restriction of the electronic apparatus 100 even though the authorization restriction of the electronic apparatus 100 should be unlocked. As another example, although the processor 120 should maintain the authorization restriction of the electronic apparatus 100, there may be a problem of unlocking the authorization restriction.

Figure 4:
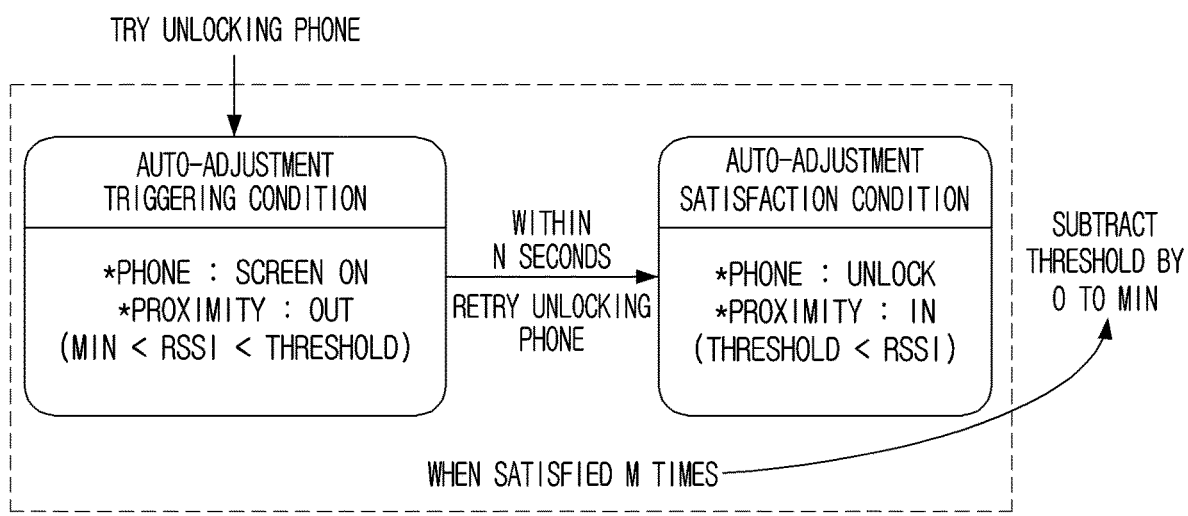
FIG. 4 is a diagram illustrating an example algorithm for adjusting a threshold value according to various embodiments.

FIG. 4 is a diagram illustrating an example algorithm for adjusting a threshold distance according to various embodiments.

Referring to FIG. 4, when a specific condition is satisfied, the processor 120 may automatically adjust (e.g., auto-adjustment) a threshold value.

According to a table shown on the left of FIG. 4, a threshold value auto-adjustment triggering condition includes a case in which strength of a received first signal is less than the threshold value (Proximity: OUT). As another example, a case in which a distance identified based on the strength of the first signal is greater than or equal to a threshold distance is included.

According to an embodiment, when the strength of the first signal is less than RSSI value (e.g., threshold value), the processor 120 may identify that the external device 200 is not close and thus maintain authorization restriction.

Satisfaction Condition of Auto-Adjustment Case 1

When authentication of the electronic apparatus 100 is completed after the first signal is received, the processor 120 may adjust RSSI value (e.g., the threshold value) based on strength of at least one signal received from the external device 200 before the first signal is received. For example, when the authentication of the electronic apparatus 100 is completed within a specific time (within N seconds in FIG. 4) while maintaining the authorization restriction as the strength of the first signal is less than the RSSI value, the processor 120 may adjust the threshold value based on the strength of at least one signal received from the external device 200 for a threshold time before the first signal is received.

For example, the processor 120 may identify strength distribution of at least one signal received from the external device 200 during a time when the first signal is received 5 seconds before the first signal is received, and identify an error range (e.g., standard deviation) of the strength of at least one signal based on the identified distribution. The processor 120 may adjust the threshold value based on the identified error range.

The authentication for the electronic apparatus 100 may include at least one of a password input, a pattern input, or biometric authentication by the user 10.

Referring to FIG. 4, the electronic apparatus 100 may be implemented as a smartphone, and when authentication by the user 10 is completed within N seconds after the first signal is received and the smartphone is unlocked (Phone: Unlock), when the first signal is received, although the electronic apparatus 100 is supposed to identify, based on strength of the first signal, that the external device 200 is close to the electronic apparatus 100 and unlock authorization restriction (strength of first signal 1>threshold value), the electronic apparatus 100 identifies the strength of the first signal is less than a threshold value (strength of first signal 1<threshold value) according to various reasons such as specifications of a signal transmission module provided in the external device 200, specifications of a signal reception module provided in the electronic apparatus 100, or combination characteristics between the electronic apparatus 100 and the external device 200, surrounding environment of the electronic apparatus 100 and the external device 200 (e.g., indoor walls, furniture, home appliances, etc.), and a moving speed of the user 10 holding the external device 200, or the like, Accordingly, the electronic apparatus 100 may adjust the threshold value in order to properly unlock the authorization restriction using the strength of the signal received from the external device 200. For example, the electronic apparatus 100 may decrease the threshold value by an error range (e.g., standard deviation) corresponding to strength distribution of at least one signal received from the external device 200 during a time when the first signal is received N seconds before the first signal is received. N seconds may be variously changed according to its manufacturer's settings and the user's settings such as 0.5 seconds, 1 second, and 5 seconds, or the like.

Satisfaction Condition of Auto-Adjustment Case 2

The processor 120 according to an embodiment may adjust the threshold value based on strength of a new signal, that is, a second signal continuously received after the first signal, while the authorization restriction of the electronic apparatus 100 is maintained.

For example, when the strength of the received new signal is greater than or equal to a threshold value in a state in which the authorization restriction is maintained, the processor 120 may unlock the authorization restriction. When there is no user input to the electronic apparatus within a threshold time after the authorization restriction is unlocked, the processor 120 may adjust the threshold value based on the strength of the received new signal.

Referring to FIG. 4, when strength of the second signal is greater than or equal to a threshold value (e.g., a distance identified (or predicted, estimated) according to the strength of the signal is less than the threshold distance (Proximity IN)), the processor 120 may unlock the authorization restriction. After the authorization restriction of the electronic apparatus 100 is unlocked, when there is no user input within a threshold time (e.g., N seconds), although the electronic apparatus 100 is supposed to identify, based on strength of the second signal, that the external device 200 is not close to the electronic apparatus 100 and maintain authorization restriction (strength of second signal 2<threshold value), the electronic apparatus 100 identifies that the strength of the second signal is greater than or equal to a threshold value (strength of second signal 1>RSSI value) according to various reasons such as specifications of a signal transmission module provided in the external device 200, specifications of a signal reception module provided in the electronic apparatus 100, or combination characteristics between the electronic apparatus 100 and the external device 200, surrounding environment of the electronic apparatus 100 and the external device 200 (e.g., indoor walls, furniture, home appliances, etc.), and a moving speed of the user 10 holding the external device 200, or the like, Accordingly, the electronic apparatus 100 may adjust the threshold value in order to properly unlock the authorization restriction using the strength of the signal received from the external device 200. For example, the electronic apparatus 100 may increase the threshold value by an error range (e.g., standard deviation) corresponding to strength distribution of at least one signal received from the external device 200 during − (minus) N/2 seconds before and + (plus) N/2 seconds after the second signal is received.

According to Case 1 in the embodiment described above, when authentication by the user 10 is completed within N seconds, even though an actual distance between the electronic apparatus 100 and the external device 200 at a time when the first signal is received is in a threshold distance, it may refer, for example, to the processor 120 identifying that strength of the first signal is less than a threshold value (or that the distance identified based on the strength of the first signal is greater than or equal to the threshold distance (Proximity OUT)), and thus the processor 120 may adjust the threshold value based on a distribution of the strength of the signal received from the external device 200 for a threshold time before the first signal is received. For example, the processor 120 may decrease (e.g., 1 m to 1.2 m) a threshold distance corresponding to the threshold value. When a signal of the same or similar strength is received thereafter, the processor 120 may unlock the authorization restriction without maintaining the restriction.

Further, according to Case 2 in the embodiment described above, if there is no user input within N seconds in a state in which the authorization restriction is unlocked based on the strength of the second signal, although an actual distance between the electronic apparatus 100 and the external device 200 exceeds the threshold distance when the second signal is received, this may refer, for example, to the processor 120 identifying that the strength of the second signal is equal to or greater than the threshold value (or, the distance identified based on the strength of the second signal is less than the threshold distance (Proximity IN)), the processor 120 may adjust the threshold value based on the distribution of the strength of at least one signal received from the external device 200 before and after the threshold time from when the second signal is received. For example, the processor 120 may increase (e.g., 1 m to 0.8 m) a threshold distance corresponding to the threshold value. When a signal of the same or similar strength is received thereafter, the processor 120 may maintain the authorization restriction without unlocking the restriction.

Hereinafter, auto-adjustment satisfaction conditions Case 1 and Case 2 may be collectively referred to as an event, for convenience of description.

The processor 120 according to an embodiment of the disclosure may adjust the threshold value when the number of occurrences (or the number of satisfactions) of an event is equal to or greater than the threshold number.

Referring to FIG. 4, when the event occurs M times, the processor 120 may adjust the threshold value according to strength of the first signal or strength of the second signal.

As another example, when a predetermined (e.g., specified) time passes after adjusting the threshold value, the processor 120 may readjust the threshold value based on a distribution of intensities of signals received for a predetermined time period. For example, the processor 120 may readjust the threshold value at regular time intervals, such as once a day, once a week, or the like.

Figure 5:
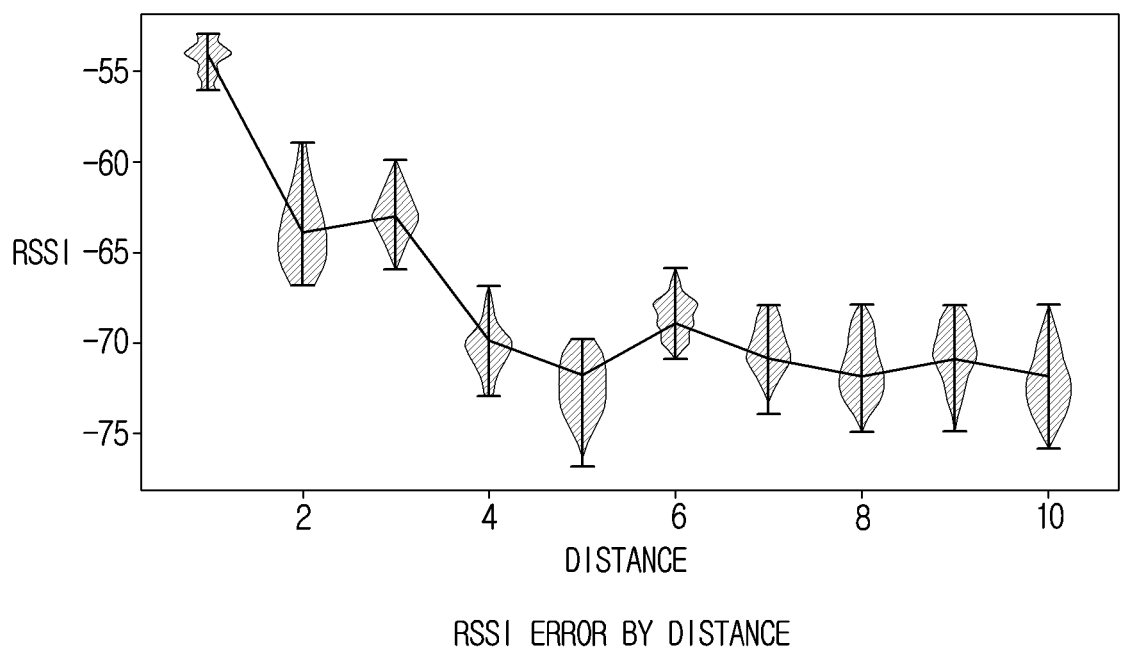
FIG. 5 is a graph illustrating an example error in strength of a signal according to various embodiments.

The processor 120 may adjust the threshold value based on the strength of the signal, and a detailed description thereof will be provided with reference to FIG. 5.

FIG. 5 is a graph illustrating an example error in strength of the signal according to various embodiments.

Referring to FIG. 5, it is a graph illustrating a distribution of RSSI values for each distance between the electronic apparatus 100 and the external device 200. The RSSI value may be a value corresponding to the strength of the signal.

For example, if the distance between the electronic apparatus 100 and the external device 200 is 1 m, the RSSI value may be distributed within −49 to −56 (dBm), and when the distance between the electronic apparatus 100 and the external device 200 is 2 m, the RSSI value may be distributed within −59 to −67 (dBm). The specific numerical values are examples and the disclosure is not limited thereto.

When the auto-adjustment triggering condition and the auto-adjustment satisfaction condition shown in FIG. 4 are satisfied, the processor may adjust the strength of the first signal, that is, the RSSI value of the first signal, and the threshold value based on the distribution of the RSSI value of at least one signal received from the external device 200 for a threshold time before the first signal is received (Case 1). As another example, the processor 120 may adjust the threshold value based on the RSSI value of the second signal and the distribution of the RSSI value of at least one signal received from the external device 200 before/after the threshold time from a time the second signal is received (Case 2).

For example, when identifying that both the auto-adjustment triggering condition and the auto-adjustment satisfaction condition CASE 1 are satisfied and adjusting the threshold value, the processor may decrease the threshold value by an error range (standard deviation) corresponding to a distribution of RSSI values of at least one signal received for a threshold time before the first signal is received. For example, when the threshold RSSI value is −49 (dBm) and an average of the RSSI values of at least one signal received during the threshold time before the first signal is received is −58 (dBm), the processor 120 may adjust the threshold RSSI value (Threshold) to be close to −58 (dBm).

Figure 6:
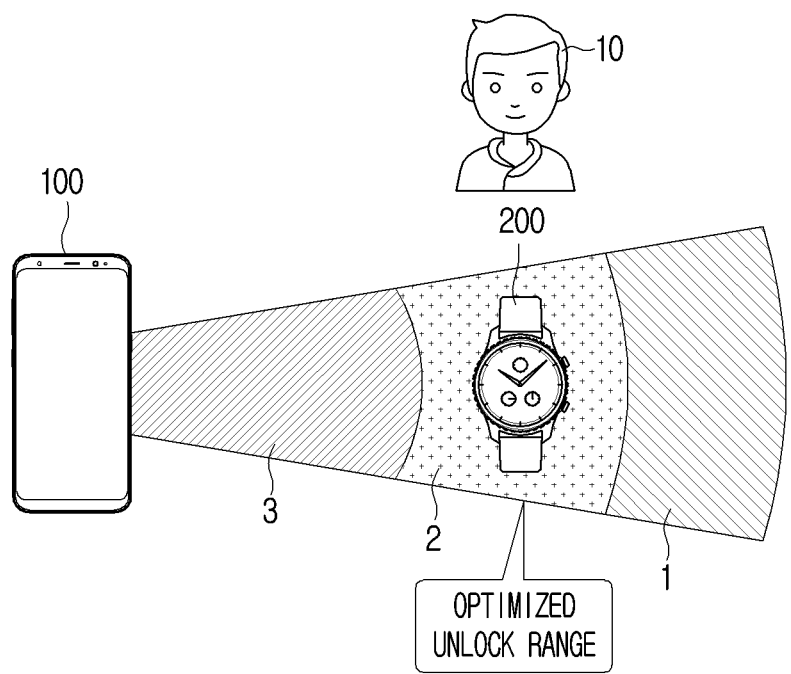
FIG. 6 is a diagram illustrating an example adjusted threshold value according to various embodiments.

FIG. 6 is a diagram illustrating an example adjusted threshold value according to various embodiments.

Referring to FIG. 6, when a signal is received from the external device 200 located in the second area 2 after the processor 120 adjusts the threshold value, since the RSSI value according to the strength of the received signal is equal to or greater than the adjusted RSSI value (optimized unlock area in FIG. 6), the processor 120 may identify the external device 200 is located close to the electronic apparatus 100. The processor 120 may unlock the authorization restriction of the electronic apparatus 100.

Figure 7:
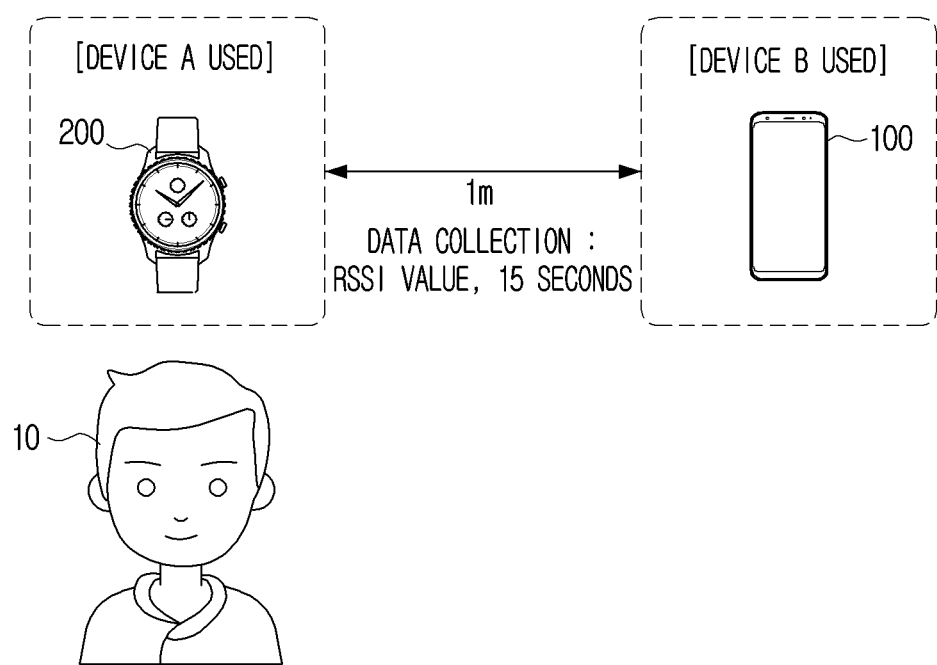
FIG. 7 is a diagram illustrating an example initial threshold value according to various embodiments.

FIG. 7 is a diagram illustrating an example initial threshold distance according to various embodiments.

Referring to FIG. 7, when the electronic apparatus 100 enters an initial setting mode, the processor 120 according to an embodiment may provide a guide such that the electronic apparatus 100 and the external device 200 are spaced apart by a threshold distance.

According to an embodiment, the processor 120 may provide a guide such that the user 10 holding the external device 200 is located about 1 m away from the electronic apparatus 100. 1 m is an arbitrary number and the disclosure is not limited thereto. In this case, since the user 10 arbitrarily separates the electronic apparatus 100 from the external device 200, the distance between the electronic apparatus 100 and the external device 200 is not an actual distance of 1 m, and an error may exist.

However, the user 10 may place the electronic apparatus 100 and the external device 200 apart by about 1 m according to a guide provided by the electronic apparatus 100 in that the user 10 may set a location at which the user 10 wants the authorization restriction to be automatically unlocked, that is, the threshold distance.

The processor 120 may set an initial threshold value based on the strength of the signal received from the external device 200. The initial threshold value may refer to a threshold value before being adjusted by the processor 120 and an RSSI value corresponding to strength of the signal received from the external device 200.

For example, the processor 120 may acquire an RSSI value according to the strength of the signal received from the external device 200 while the guide is provided, and set a threshold value to the acquired RSSI value. For example, the processor 120 may set the threshold value based on an average of RSSI values of the strengths of the plurality of signals received from the external device 200 for 15 seconds.

According to the various embodiments described above, a threshold value optimized for a behavior pattern of the user 10 and a combination features of the electronic apparatus 100 and the external device 200 may be set, and since the threshold is reset in consideration of the user's 10 usage pattern and usage environment (e.g., indoor environment characteristics), an optimized unlock area may be set.

Figure 8:
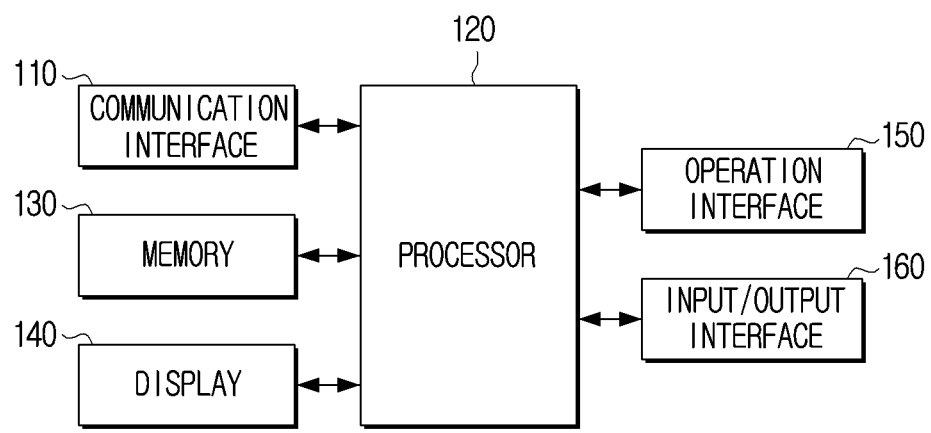
FIG. 8 is a block diagram illustrating an example configuration of an electronic apparatus according to various embodiments.

FIG. 8 is a block diagram illustrating an example configuration of an electronic apparatus according to various embodiments.

Referring to FIG. 8, the electronic apparatus 100 may include a communication interface (e.g., including communication circuitry) 110, a processor (e.g., including processing circuitry) 120, a memory 130, a display 140, an operation interface (e.g., including various circuitry) 150, and an input/output interface (e.g., including input/output circuitry) 160. A description duplicated with FIG. 2 may not be repeated here.

According to an embodiment of the disclosure, the memory 130 included in the electronic apparatus 100 may be implemented as an internal memory such as a ROM (e.g., electrically erasable programmable read-only memory (EE-PROM)), a RAM, or the like, included in the processor 140, or may be implemented as a memory separate from the processor 140. In this case, the memory 130 may be implemented in the form of a memory embedded in the electronic apparatus 100 or may be implemented in the form of a memory detachable to the electronic apparatus 100 depending on a purpose of data storage. For example, data for driving the electronic apparatus 100 may be stored in a memory embedded in the electronic apparatus 100, and data for an extended function of the electronic apparatus 100 may be stored in a memory detachable from the electronic apparatus 100. The memory embedded in the electronic apparatus 100 may be implemented as at least one of a volatile memory (e.g., dynamic RAM (DRAM), static RAM (SRAM), or synchronous dynamic RAM (SDRAM)), non-volatile memory (e.g., one time programmable ROM (OT-PROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD), and the memory detachable from the electronic apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to the USB port (e.g., USB memory), or the like.

For example, the memory 130 according to an embodiment of the disclosure may store adjustable range information of a threshold value (or threshold distance). For example, since the threshold value is an area where authorization restriction is automatically unlocked, it is highly relevant to security issues. When the threshold value is infinitely reduced, there is a problem in that it is identified that a distance between the electronic apparatus 100 and the external device 200 is close, the authorization restriction of the electronic apparatus 100 is automatically unlocked even if the user 10 does not want it. Accordingly, the memory 130 may store the adjustable range information of the threshold value. For example, the adjustable range may not exceed a maximum of 8 m. The specific numerical values are only examples.

The display 140 may display various screens. For example, the display 140 may provide a guide.

The display 140 may be implemented as a display including, for example, and without limitation, a self-luminous element or a display including a non-light-emitting device and a backlight. For example, the display may be implemented in various types of displays such as, for example, and without limitation, liquid crystal display (LCD), organic light emitting diodes (OLED) displays, light emitting diodes (LED), micro LED, Mini LED, plasma display panel (PDP), quantum dot (QD) displays, quantum dot light-emitting diodes (QLEDs), or the like. In the display 140, a driving circuit, a backlight unit, or the like, which may be implemented in the form of an a-si TFT, a low temperature poly silicon (LTPS) TFT, an organic TFT (OTFT), or the like may also be included. Meanwhile, the display 140 may be implemented as a touch screen combined with a touch sensor, a flexible display, a rollable display, a three-dimensional (3D) display, a display in which a plurality of display modules are physically connected, or the like.

The operation interface 150 may include various circuitry and may be implemented as a button, a touch pad, a mouse, a keyboard, or the like, or may be implemented as a touch screen capable of performing the above-described display function and manipulation input function. The button may refer to various types of buttons such as a mechanical button, a touch pad, a wheel, etc. formed in an arbitrary area such as a front portion, a side portion, a rear portion, or the like of the exterior of body of the electronic apparatus 100.

The input/output interface 160 may include various input/output circuitry and be an interface one of High Definition Multimedia Interface (HDMI), Mobile High-Definition Link (MHL), Universal Serial Bus (USB), Display Port (DP), Thunderbolt, Video Graphics Array (VGA) port, RGB port, a D-subminiature (D-SUB), and a digital visual interface (DVI).

The input/output interface 160 may input/output at least one of audio and video signals.

Depending on the implementation, the input/output interface 160 may include a port for inputting and outputting only an audio signal and a port for inputting and outputting only a video signal as separate ports, or may be implemented as a single port for inputting and outputting both an audio signal and a video signal.

Figure 9:
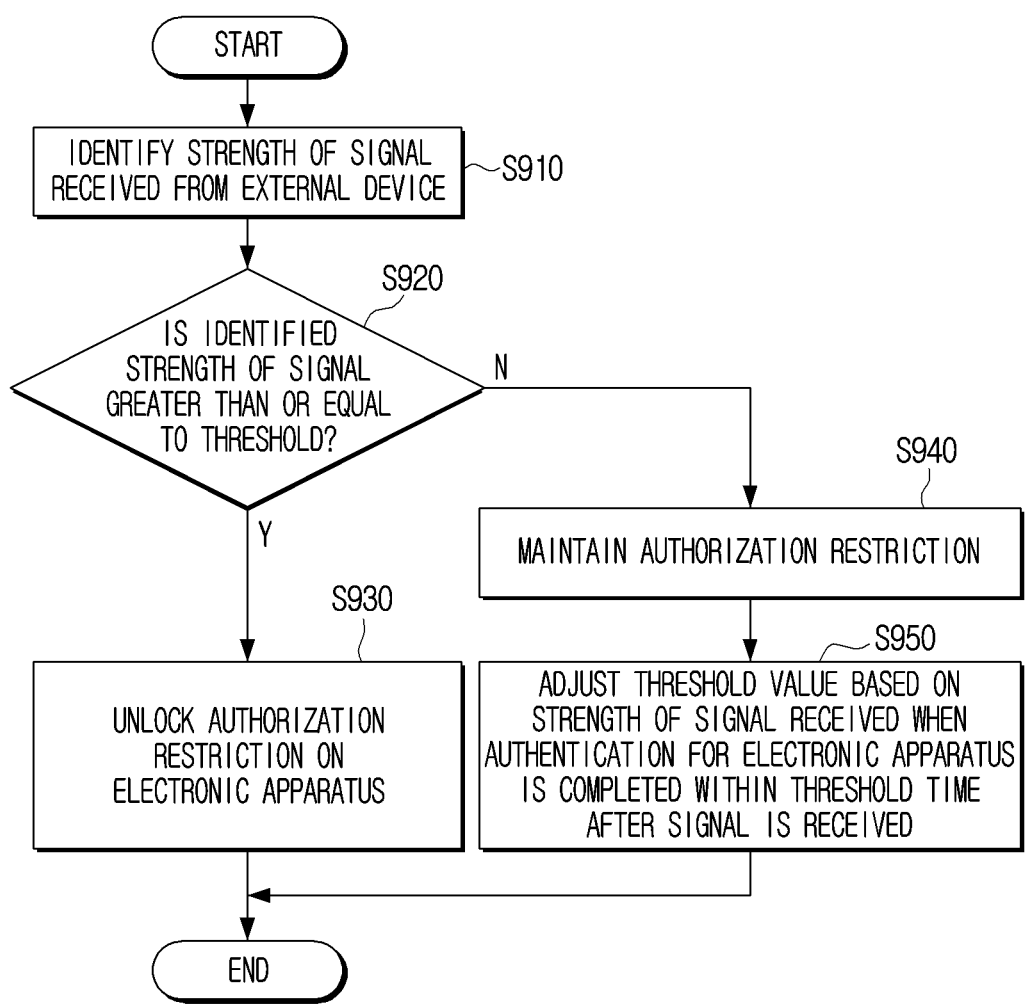
FIG. 9 is a flowchart illustrating an example method of controlling an electronic apparatus according to an embodiment.

FIG. 9 is a flowchart illustrating an example method of controlling an electronic apparatus according to various embodiments.

Referring to FIG. 9, the control method of the electronic apparatus may identify strength of the signal received from an external device (S910).

If the identified strength of the signal is greater than or equal to the threshold (S920: Y), the authorization restriction on the electronic apparatus may be unlocked (S930).

As another example, when the strength of the identified signal is less than a threshold value (S920: N), the authorization restriction may be maintained (S940), and when authentication for the electronic apparatus is completed after the signal is received, the threshold value may be adjusted based on the strength of at least one signal received from an external device before the signal is received (S950).

The adjusting S950 may include identifying the strength of at least one signal received for a threshold time before the signal is received, and adjusting the threshold value based on a distribution of the strength of the at least one signal.

The adjusting S950 may include identifying the strength of a new signal continuously received in a signal in a state in which the authorization restriction is maintained, and unlocking the authorization restriction when the strength of the new signal is greater than or equal to the threshold value.

The control method according to an embodiment of the disclosure may further include adjusting a threshold value based on the strength of a new signal when there is no user input to the electronic apparatus within a threshold time after the authorization restriction is unlocked.

The external device according to an embodiment may be a device pre-registered in the electronic apparatus to unlock the authorization restriction when a distance to the electronic apparatus is less than the threshold distance.

The control method according to an embodiment may further include identifying a distance to an external device based on the strength of a signal and identifying whether the identified distance is less than a threshold distance, wherein the threshold distance may correspond to the threshold value.

According to the method for controlling may further include based on entering an initial setting mode, providing a guide such that the external device and the electronic apparatus are spaced apart by a threshold distance, and setting a threshold value based on the strength of the signal received from the external device while the guide is provided.

The providing the guide may include, when the external device is an unregistered device or when performing first communication with the external device, enter the initial setting mode and provide the guide.

The adjusting S950 according to an embodiment may include readjusting the threshold value when an event occurs more than a threshold number of times or when a predetermined (e.g., specified) time elapses after adjusting the threshold value, the event may be an event in which the authentication is completed within a predetermined time in a state that the authorization restriction is maintained according to the strength of the identified signal being less than the threshold value.

Authentication according to an embodiment may include at least one of password input, pattern input, and biometric authentication by a user.

In addition, according to an embodiment, various embodiments described above may be implemented in a recording media that may be read by a computer or a similar device to the computer by suing software, hardware, or a combination thereof. In some cases, the embodiments described herein may be implemented by the processor itself. In a software configuration, various embodiments described in the disclosure such as a procedure and a function may be implemented as separate software modules. The software modules may respectively perform one or more functions and operations described in the disclosure According to various embodiments described above, computer instructions for performing processing operations of the electronic apparatus 100 according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer-readable medium may semi-permanently store data and is available of reading by the device. For example, the non-transitory computer-readable medium may be CD, DVD, a hard disc, Blu-ray disc, USB, a memory card, ROM, or the like.

The foregoing example embodiments and advantages are merely examples and are not to be construed as limiting the disclosure. The present teaching can be readily applied to other types of apparatuses. Also, the description of the example embodiments is intended to be illustrative, and not to limit the scope of the claims, and many alternatives, modifications, and variations will be apparent to those skilled in the art. It will also be understood that any of the embodiment(s) described herein may be used in conjunction with any other embodiment(s) described herein.

What is claimed is:

1. An electronic apparatus comprising:
a communication interface comprising communication circuitry; and
a processor configured to:
identify strength of a signal received from an external device through the communication interface, and
based on the strength of the signal being greater than or equal to a threshold value, unlock authorization restriction on the electronic apparatus, wherein the processor is further configured to:
based on the strength of the signal being less than the threshold value, maintain the authorization restriction, and
based on authentication of the electronic apparatus being completed after the signal is received, identify the strength of at least one signal received for a threshold time before the signal is received, and adjust the threshold value based on a distribution of the strength of the at least one signal.

2. The electronic apparatus of claim 1,
wherein the external device comprises a device pre-registered in the electronic apparatus to unlock the authorization restriction based on a distance to the electronic apparatus being less than a threshold distance.

3. The electronic apparatus of claim 2, wherein the processor is configured to:
identify a distance to the external device based on the strength of the signal, and
identify whether the identified distance is less than the threshold distance,
wherein the threshold distance corresponds to the threshold value.

4. The electronic apparatus of claim 1, wherein the processor is configured to:
based on entering an initial setting mode, provide a guide such that the external device and the electronic apparatus are spaced apart by a threshold distance, and
set the threshold value based on the strength of the signal received from the external device while the guide is provided.

5. The electronic apparatus of claim 4, wherein the processor is configured to:
based on the external device being an unregistered device, or based on the electronic apparatus performing first communication with the external device, enter the initial setting mode and provide the guide.

6. The electronic apparatus of claim 1, wherein the processor is configured to:
- based on an event occurring more than a threshold number of times, or based on a certain time elapsing after adjusting the threshold value, readjust the threshold value, and
- wherein the event includes an event in which the authentication is completed within a specified time in a state that the authorization restriction is maintained based on the strength of the signal being less than the threshold value.

7. The electronic apparatus of claim 1, wherein the authentication includes at least one of password input, pattern input, or biometric authentication.

8. An electronic apparatus comprising:
- a communication interface comprising communication circuitry; and
- a processor configured to:
  - identify strength of a signal received from an external device through the communication interface, and
  - based on the strength of the signal being greater than or equal to a threshold value, unlock authorization restriction on the electronic apparatus,
- wherein the processor is further configured to:
  - based on the strength of the signal being less than the threshold value, maintain the authorization restriction, and
  - based on authentication of the electronic apparatus being completed after the signal is received, identify strength of a new signal continuously received in a state in which the authorization restriction is maintained, based on the strength of the new signal being equal to or greater than the threshold value, unlock the authorization restriction, and based on no input to the electronic apparatus being received within a threshold time after the authorization restriction is unlocked, adjust the threshold value based on the strength of the new signal.

9. A method for controlling an electronic apparatus comprising:
- identifying strength of a signal received from an external device;
- based on the strength of the signal being greater than or equal to a threshold value, unlocking authorization restriction on the electronic apparatus; and
- based on the strength of the signal being less than the threshold value, maintaining the authorization restriction, and based on authentication of the electronic apparatus being completed after the signal is received, identifying a strength of at least one signal received for a threshold time before the signal is received, and adjusting the threshold value based on a distribution of the strength of the at least one signal.

10. The method of claim 9,
- wherein the adjusting includes identifying a strength of a new signal continuously received in a state in which the authorization restriction is maintained, and
- based on the strength of the new signal being equal to or greater than the threshold value, unlocking the authorization restriction.

11. The method of claim 10,
- wherein the adjusting includes, based on no input to the electronic apparatus being received within a threshold time after the authorization restriction is unlocked, adjusting the threshold value based on the strength of the new signal.

12. The method of claim 9,
- wherein the external device comprises a device pre-registered in the electronic apparatus to unlock the authorization restriction based on a distance to the electronic apparatus being less than a threshold distance.

13. The method of claim 12, further comprising:
- identifying a distance to the external device based on the strength of the signal; and
- identifying whether the identified distance is less than the threshold distance, and
- wherein the threshold distance corresponds to the threshold value.

14. The method of claim 9, further comprising:
- based on entering an initial setting mode, providing a guide such that the external device and the electronic apparatus are spaced apart by a threshold distance; and
- setting the threshold value based on the strength of the signal received from the external device while the guide is provided.

15. The method of claim 14, wherein the providing the guide comprises, based on the external device being an unregistered device, or based on performing first communication with the external device, entering the initial setting mode and providing the guide.

16. The method of claim 9,
- wherein the adjusting the threshold value comprises, based on an event occurring more than a threshold number of times, or based on a certain time elapsing after adjusting the threshold value, readjusting the threshold value, and
- wherein the event includes an event in which the authentication is completed within a specified time in a state that the authorization restriction is maintained based on the strength of the signal being less than the threshold value.

17. The method of claim 9,
- wherein the authentication includes at least one of password input, pattern input, or biometric authentication.

* * * * *